United States Patent [19]

Clendinen

[11] 4,409,706
[45] Oct. 18, 1983

[54] STUD AND EYELET FASTENER

[76] Inventor: Charles D. Clendinen, 152 Lodewyck, Mt. Clemens, Mich. 48043

[21] Appl. No.: 340,204

[22] Filed: Jan. 18, 1982

Related U.S. Application Data

[63] Continuation-in-part of Ser. No. 255,370, Apr. 20, 1981, and a continuation-in-part of Ser. No. 340,203, Jan. 18, 1982.

[51] Int. Cl.³ .............................................. A44B 17/00
[52] U.S. Cl. ................................................. 24/208 A
[58] Field of Search ........... 24/208 A, 208 R, 201 HE

[56] References Cited

U.S. PATENT DOCUMENTS 3,416,200 12/1968 Daddona, Jr. .................. 24/208 A Primary Examiner—Robert Peshock
Attorney, Agent, or Firm—Burton, Parker & Schramm

[57] ABSTRACT

A stud and eyelet fastener is positively locked together by pivoting the eyelet on the stud in an eyelet pivot seat to an askew position requiring the eyelet to snap past a latching shoulder, and wherein the stud and/or eyelet deforms within the elastic limit as the eyelet passes the latching shoulder.

11 Claims, 5 Drawing Figures

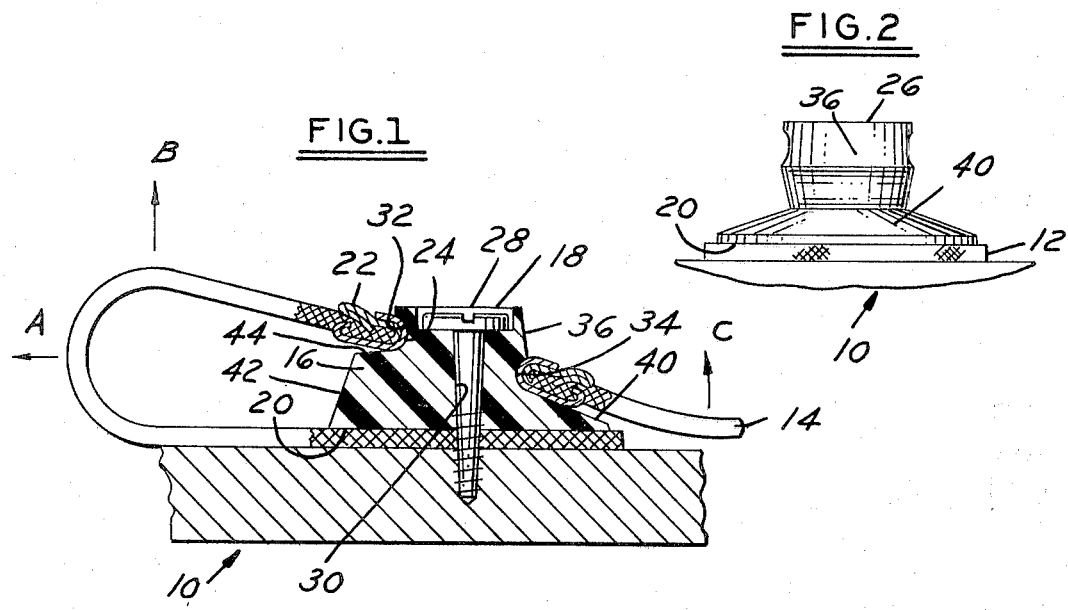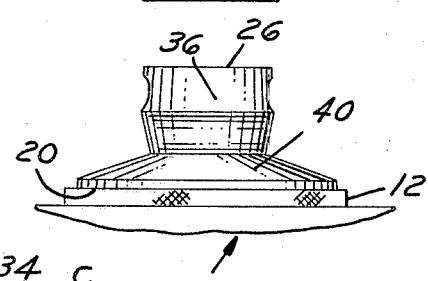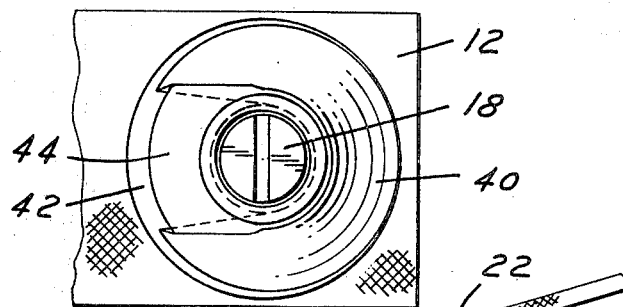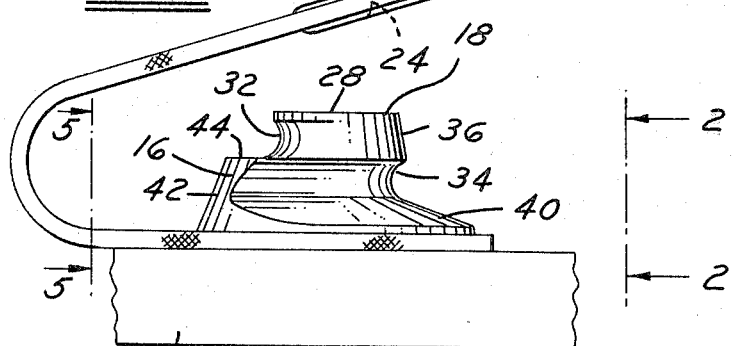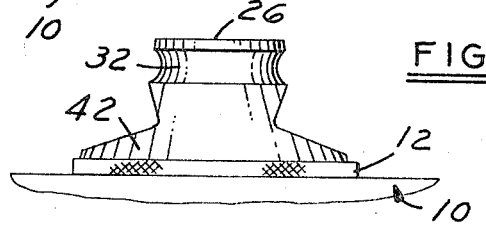

STUD AND EYELET FASTENER

Related Application

This application is a continuation-in-part of my prior filed application Ser. No. 255,370, filed Apr. 20, 1981, which is incorporated herein by reference, and another continuation-in-part application, Ser. No. 340,203, filed Jan. 18, 1982.

DESCRIPTION

1. Field of Invention

This invention relates to stud and eyelet fasteners of the snap fastener type intended to temporarily connect together members with which the stud and eyelet are respectively associated.

2. Background of the Invention

There has been a long-felt need for a fastener which overcomes some of the problems associated with the snap button fastener, such as the DOT ® fastener found in service on boat covers and many other canvas and the like articles. Some of the problems associated with the conventional DOT ® type fastener are:

(a) There is a critical tolerance requirement that makes snap buttons unpredictable as to holding strength. Since snap buttons operate by the critical mating of two dimensions, they are subject to great variation in holding strength because of variations in dimensions or tolerances in the spring ring and male stud parts. Because most snap button fasteners are sheet brass made on progressive dies, they are soft enough to be deformed during usage and this can render them inoperable or change their holding characteristics, making them either too loose or too tight.

(b) Weathering of the parts of snap button fasteners can make the buttons too tight to pull apart, especially in hostile environments like salt water, industrial pollution and the like.

(c) Limited strength due to manufacture from sheet brass or molded plastic construction renders the conventional snap button fastener of limited utility when confronting heavy loads.

(d) There is considerable difficulty in operating such a fastener when either the male or female side of the fastener is covered with foreign matter such as dust, mud, ice, grease, etc.

In the prior art the following patents depict fastening devices in which a stud and/or eyelet must be deformed as a necessary condition precedant to latching or locking the stud and eyelet together: U.S. Pat. Nos. 991,156; 2,397,801; 2,986,790; 3,213,507; 3,349,451; 3,416,200; 3,729,780 and 3,786,982.

SUMMARY OF THE INVENTION

I have discovered that a stud and eyelet fastener may be provided in which there are no moving parts except the stud member and the eyelet member which are so arranged and dimensioned that they are temporarily deformed or deflected as they are urged into a locked relation. However, the stud and eyelet fastener of my invention retains the desirable features of the prior art snap button fasteners of providing a single point attachment with one rivet, screw, bolt, etc. In addition, my improved fastener may be made in sizes from very small to very large to accommodate varying applications. It may be formed of a variety of materials to accommodate the various requirements of the environment in which it may be used. In addition the fastener may be applied to either rigid or flexible materials and may effect either a temporary or permanent securement thereof, though the fastener is essentially intended for temporary connection which may be readily disconnected as desired. The eyelet has an aperture dimensioned to telescope over the stud and rest at one side on the seat with the eyelet caught at the other side beneath the shoulder. The aperture of the eyelet is dimensioned to provide an interference fit with the stud as the eyelet is pivoted in said seat to be caught beneath the latching shoulder. The stud and/or eyelet may yield within the elastic limit to permit the pivoting of the eyelet through the interference fit to snap and be caught beneath the latching shoulder.

This improvement differs from the structure disclosed in my prior application Ser. No. 255,370, filed Apr. 20, 1981, or in a certain continuation-in-part of such application, Ser. No. 340,203 filed Jan. 18, 1982, in that the stud and eyelet are positively held in the latched condition without the use of any other parts than the stud and eyelet themselves. The stud may be a molded plastic part or a metal part formed in a progressive die, and when it is formed it is complete and ready for use with the eyelet after simply being mounted on whatever part is to be fastened with it. The eyelet is of conventional configuration and need not be provided with any special equipments except that its aperture should be properly sized for the stud with which it is to be used.

Other features and advantages will become apparent during the following description.

BRIEF DESCRIPTION OF THE DRAWINGS

FIG. 1 is a side elevation partly in section through a stud and eyelet fastener embodying my invention;

FIG. 2 is a front elevation taken in the direction of arrows 2—2 in FIG. 4;

FIG. 3 is a top plan view of the fastener shown in FIG. 1 with the eyelet removed for clarity;

FIG. 4 is a side elevation similar to FIG. 1 but before the eyelet is snapped on the stud; and FIG. 5 is a rear elevation taken in the direction of the arrows 5—5 of FIG. 4.

DETAILED DESCRIPTION OF PREFERRED EMBODIMENT

Fasteners of my invention may have a wide variety of applications, such as for securement of canvas-like products to a rigid support, or the securement of fabric products together. In FIG. 1 I have shown a member or part 10 which may be taken as one of the elements to be fastened. In addition I have shown a flexible strap of fabric material 12 having a tab end 14. The strap is disposed between a stud member 16 and the member 10, for which purpose a screwthreaded fastener 18 extends down through stud 16 and is threaded into member 10, whereby the strap is gripped between the base end 20 of the stud and the member 10. If desired, the stud 16 could be secured only to the strap as by a rivet or the like, and the member 10 completely eliminated.

An eyelet 22 of conventional construction is mounted in strap 12. The eyelet has an aperture 24 dimensioned to be telescoped over the stud. The diameter of the aperture 24 should be accurately sized as by the tools or method shown and described in connection with FIGS. 15 and 16 of the co-pending application Ser. No.

255,370 or the continuation-in-part of Ser. No. 340,203, filed Jan. 18, 1982.

Opposite the base end 20 of the stud there is a free end 26 within which there is a counterbore 28 for receiving the head of the screw or other fastening device 18. In addition, the stud includes a bore 30 extending from the bottom of the counterbore through the base end 20 to receive the shank of the fastening device 18. The bore and counterbore provide a means for facilitating the mounting of the stud on the part 10 and strap 12. Many other expedients may be provided as desired by those skilled in the art for facilitating the securement of the stud to whatever part it is to be mounted on. In addition, it is conceivable that the stud may be integrally molded as a plastic part with the member 10, if such is desired.

Between the base end 20 and the free end 26 the stud is generally of circular or cylindrical configuration and is provided with an eyelet pivoting seat 32 arranged adjacent the free end 26. This seat may be disposed on one side of the stud as shown in the drawings. The other side of the stud at a point diagonally from the seat is provided with a latching shoulder 34. This latching shoulder faces in the direction of the base end 20 of the stud. It will be noted that the eyelet pivoting seat 32 and the latching shoulder 34 are formed as integral parts of the stud member and if the stud is formed as a molded plastic part may be simply molded as facets thereof. It will be noted that the seat 32 blends into the stud circumferentially therearound and disappears into an outwardly tapering surface 36 disposed on the opposite side of the stud from the seat and extending from the free end 26 toward the latching shoulder 34. This sloping surface 36 acts somewhat as a camming surface during pivotal movement of the eyelet into its latched position shown in FIG. 1.

The aperture 24 in the eyelet is dimensioned to telescope over the stud 16 and nest as shown in FIG. 1 in the eyelet pivot seat 32. In the embodiment disclosed, and having reference to FIG. 1, the eyelet is shown in an askew position on the stud, one side nesting in the seat 32 and the other side caught beneath the latching shoulder 34. The dimension of the aperture 24 in the eyelet permits this arrangement and relationship. However, before the eyelet may be pivoted in the seat 32 to the position shown in FIG. 1, it must pass over the stud just above the latching shoulder and it will be noted that with the slope of the side at 36, the dimension of the aperture and the stud taken between side 36 and the bottom of the seat 32, creates an interference fit between the stud and eyelet. With proper relative dimensioning of the eyelet and stud, which may vary depending upon the particular application, the interference fit should be such that when the eyelet is pivoted down over the stud, the stud and/or eyelet will yield within the elastic limit to permit the telescoping of the eyelet to the position shown in FIG. 1. This temporary deformation or deflection of the stud and/or eyelet causes a resistance to the movement of the eyelet to its latched position beneath the shoulder 34, and when the eyelet is engaged beneath the shoulder, there is an audible snapping signal indicating to the user that the stud and eyelet are now in latched condition.

The side of the stud opposite the seat and beneath the shoulder 34 tapers outwardly toward the base end 20, providing a sloping surface 40 which lies an at angle substantially the same as or parallel the diagonal between the seat 32 and the shoulder 34, whereby the eyelet may lie in its latched condition as shown in FIG. 1 against the surface 40.

The stud 16 is provided with an enlarged portion 42 which is utilized to form the bottom of the seat, providing a bearing surface 44 against which the eyelet may be drawn where substantial forces may be applied in the direction of arrow A as shown in FIG. 1. Forces in the direction of arrow A will simply pull the eyelet tightly against the surface 34, and forces in the direction of arrow B will be resisted by the seat 32 so that the eyelet remains firmly anchored on the stud. To release the eyelet from the stud, the tab end 14 is simply jerked upwardly in the direction of arrow C and the eyelet easily comes off the stud.

The stud may be formed of any suitable material. Such material may comprise nylon or Delrin or Delrin with Teflon filling or Teflon itself. The stud may be molded of such plastics and it is not intended that the material of the stud be limited to those specifically mentioned, as any suitable material having the requisite strength and modulus of elasticity to enable the eyelet and stud to be pressed together as aforesaid can be used. I have found that suitable plastics have a flex modulus for nylon, such as Type 66 Zytel 101, between 125,000 psi and 600,000 psi. For a Teflon-filled Delrin, a suitable flex modulus may lie in the range of 340,000 to 730,000. Both of these ranges of flex moduli are taken when the plastic is at 73° F.

The eyelet may be formed of plastic or metal, such as brass or brass-coated metal. While the eyelet is shown as open, it may be closed at one side as a snap button to cover and conceal the stud. The stud may also be formed of metal as in a progressive die.

I claim:

1. A fastener comprising, in combination:
    a stud;
    means providing an eyelet seat at one side of the stud;
    means providing an eyelet latching shoulder at the opposite side of the stud from the seat;
    an eyelet having an aperture dimensioned to telescope over the stud and rest at one side on said seat with the eyelet encircling the stud and being pivotable on the seat between an unlatched position wherein it is removable from the stud, and a latched position lower on the stud than the unlatched position and caught at its opposite side beneath the latching shoulder;
    said aperture being dimensioned to provide an interference fit between the eyelet and stud as the eyelet is pivoted on said seat between latched and unlatched positions between latched and unlatched positions; and
    said stud and/or eyelet yielding within the elastic limit to permit pivoting of the eyelet through said interference fit to be caught beneath or released from the latching shoulder.

2. The invention defined by claim 1 wherein the latching shoulder is disposed diagonally from the eyelet seat on the opposite side of the stud.

3. The invention defined by claim 1 wherein said means providing an eyelet seat comprises an integral portion of the stud.

4. The invention defined by either claims 1, 2 or 3, wherein said means providing an eyelet latching shoulder comprises an integral portion of the stud.

5. The invention defined by claim 1 wherein the stud is provided with a base end for mounting on a part to be fastened and a free end spaced from the base end, and said eyelet seat is disposed adjacent the free end and the latching shoulder is disposed diagonally on the opposite side of the stud toward the base end.

6. The invention defined by claim 5 wherein the side of the stud opposite the seat tapers outwardly from the free end of the stud toward the latching shoulder, providing a camming surface upon which the eyelet rides as it pivots on said seat to a position caught beneath the latching shoulder.

7. The invention defined by claim 5 wherein the stud tapers outwardly toward the base end of the stud between said shoulder and the base end at an angle paralleling the skew angle of the eyelet on the stud.

8. A fastener comprising, in combination:
a stud having a pivot seat on one side and a latching shoulder on the opposite side diagonally from the seat;
an eyelet having an aperture dimensioned to telescope over the stud and nest at one side in said seat with the eyelet lying askew the stud caught at the other side beneath said shoulder;
said aperture being dimensioned to provide an interference fit with the stud as the eyelet is pivoted in said seat to the skewed position; and
said stud and/or eyelet yielding within the elastic limit to permit pivoting of the eyelet through said interference fit to be caught or released from the latching shoulder.

9. A stud for a stud and eyelet fastener comprising:
a stud adapted to be mounted in upstanding relation on a part to be fastened and shaped to provide an eyelet pivot seat on one side adjacent one end of the stud and shaped to provide a latching shoulder on the opposite side diagonally downward from the seat and facing generally toward the opposite end of the stud; and
said stud provided with means for facilitating mounting of the last mentioned end upon the part to be fastened.

10. The invention defined by claim 9 wherein the side of the stud between said shoulder and said opposite end of the stud tapers outwardly at an angle approximately equal to the diagonal angle between said seat and shoulder.

11. The invention defined by claim 9 wherein the stud is made of plastic having a flex modulus lying in the range of 125,000 psi to 730,000 psi at a temperature of 73° F.

* * * * *

UNITED STATES PATENT OFFICE
CERTIFICATE OF CORRECTION

Patent No. 4,409,706  Dated October 18, 1983

Inventor(s) CHARLES D. CLENDINEN

It is certified that error appears in the above-identified patent and that said Letters Patent are hereby corrected as shown below:

In column 4, lines 51 and 52, delete "between latched and unlatched positions".

Signed and Sealed this

Twenty-first Day of February 1984

[SEAL]

Attest:

GERALD J. MOSSINGHOFF

Attesting Officer    Commissioner of Patents and Trademarks